United States Patent [19]

Fukushima

[11] Patent Number: 5,781,347
[45] Date of Patent: Jul. 14, 1998

[54] OPTICAL DEVICE

[75] Inventor: Nobuhiro Fukushima, Kawasaki, Japan

[73] Assignee: Fujitsu Limited, Kawasaki, Japan

[21] Appl. No.: 699,041

[22] Filed: Aug. 19, 1996

[30] Foreign Application Priority Data

Feb. 7, 1996 [JP] Japan ................. 8-021446

[51] Int. Cl.⁶ .................. G02B 6/26; G02B 6/32
[52] U.S. Cl. ............ 359/674; 385/31; 385/33; 385/48; 385/50; 359/194
[58] Field of Search ........................ 385/9, 31, 33, 385/39, 48, 50; 359/194, 674, 675, 726, 727

[56] References Cited

U.S. PATENT DOCUMENTS

| | | | |
|---|---|---|---|
| 4,997,250 | 3/1991 | Ortiz | 385/48 |
| 5,402,509 | 3/1995 | Fukushima | 385/33 |
| 5,513,289 | 4/1996 | Hosokawa et al. | 385/33 |
| 5,555,330 | 9/1996 | Pan et al. | 385/39 |
| 5,559,911 | 9/1996 | Forkner et al. | 385/33 |

*Primary Examiner*—Nelson Moskowitz
*Attorney, Agent, or Firm*—Staas & Halsey

[57] ABSTRACT

An optical device including a lens located between a first port and a second port, and a photodetector having a photodetecting surface located in the vicinity of the second port. The first port and the second port have a first aperture and a second aperture, respectively. The lens has a converging portion for converting a light beam so as to couple the first aperture and the second aperture, and a deflecting portion for deflecting a part of a light beam from the first port to make the part incident on the photodetecting surface. The converging portion and the deflecting portion are integral with each other, for example. By using this optical device, light power can be monitored stably with no polarization dependence.

8 Claims, 3 Drawing Sheets

OPTICAL DEVICE

BACKGROUND OF THE INVENTION

1. Field of the Invention

The present invention relates to an optical device having a function of detecting branched light.

In a system using an optical fiber as a transmission line, elimination of polarization dependence from an optical device is an important technical subject. Light output from a laser diode used as a transmission light source is linearly polarized light in general, so that the linearly polarized light undergoes various disturbances such as application of a stress to the optical fiber and temperature changes during propagation in the optical fiber transmission line. As a result, a polarized condition of signal light to be received by a receiving end changes with time. In a system having an optical amplifier, amplification characteristics stable irrespective of a polarized condition of input signal light is required. Accordingly, the optical amplifier or an optical device incorporated in the optical amplifier is required to eliminate or greatly reduce polarization dependence.

2. Description of the Related Art

Conventionally known is an optical amplifier having a doped fiber doped with a rare earth element such as Er (erbium). In performing ALC (automatic level control) in this kind of optical amplifier to stabilize a light output level, an optical device for branching and monitoring light is used to branch a light beam on a main optical path to obtain a monitoring beam. The power of the monitoring beam is then converted into an electrical signal by a photodetector, and a degree of optical pumping for the doped fiber is controlled so that the level of the electrical signal becomes constant. In general, the optical pumping for the doped fiber is performed by pump light having a predetermined wavelength, and the power of the pump light is therefore feedback-controlled.

FIG. 1 is a view showing a conventional optical device for branching and monitoring light. To couple a beam 4 output from an excitation end 2A of an optical fiber 2, which excitation end 2A has a given aperture, or incident on the excitation end 2A and a beam 8 incident on an excitation end 6A of another optical fiber 6, which excitation end 6A has a given aperture, or output from the excitation end 6A, there are provided lenses 10 and 12 respectively opposed to the excitation ends 2A and 6A to form a collimated beam 14. An optical film 16 for branching light is provided between the lenses 10 and 12 so as to obliquely intersect the collimated beam 14. A beam 18 reflected from the optical film 16 is incident on a photodetector 20.

FIG. 2 is a view showing another conventional optical device for branching and monitoring light. Throughout the drawings, substantially the same parts are denoted by the same reference numerals. In the optical device shown in FIG. 2, a total reflection surface 22 such as a knife edge is provided so as to obliquely intersect an outer peripheral portion of a collimated beam 14, so that a part of the collimated beam 14 is reflected by the total reflection surface 22, and a reflected beam 24 from the total reflection surface 22 is incident on a photodetector 20.

In the optical device shown in FIG. 1, the branching ratio of the optical film 16 is defined as the ratio of the power of the reflected beam 18 to the total power of the light beam propagating from the left to the right as viewed in FIG. 1. The ratio between transmitted light power and reflected light power in the optical film 16 depends on the polarized condition of incident light. Accordingly, the branching ratio of the optical film 16 has polarization dependence.

In performing feedback control of the power of pump light for an optical amplifier by using an electrical signal output from the photodetector 20, for example, the output level of the optical amplifier depends on the polarized condition of input light because of the polarization dependence of the branching ratio, causing an inconvenience in constructing a system.

In the optical device shown in FIG. 2, the power of the reflected beam 24 depends on the area of intersection of the total reflection surface 22 with respect to the collimated beam 14, so that the relative positional relation between the collimated beam 14 and the total reflection surface 22 has a direct influence upon a branching ratio. Accordingly, in consideration of thermal stress and mechanical external force applied to members for supporting optical components, the optical device shown in FIG. 2 cannot obtain a stable branching ratio.

SUMMARY OF THE INVENTION

It is therefore an object of the present invention to provide an optical device which can obtain a stable branching ratio having no polarization dependence.

In accordance with the present invention, there is provided an optical device comprising a first port having a first aperture; a second port having a second aperture; a lens located between the first port and the second port; and a photodetector having a photodetecting surface located in the vicinity of the second port. The lens has a converging portion for converting a light beam so as to couple the first aperture and the second aperture, and a deflecting portion for deflecting a part of a light beam from the first port to make the part incident on the photodetecting surface.

In the specification of the present invention, coupling optical fibers together, coupling excitation ends of optical fibers together, coupling apertures of excitation ends together, and coupling beams between excitation ends together all means optically connecting optical fibers or optical elements.

In the optical device of the present invention, the lens having a specific configuration is used to allow a beam to be partially deflected by the deflecting portion and allow the partially deflected beam to be received by the photodetector. Accordingly, polarization dependence of a branching ratio can be eliminated or greatly reduced, and a stable branching ratio can be obtained.

In the case that the first and second ports are excitation ends of optical fibers, it is possible to provide an optical device for branching and monitoring light which can obtain a stable branching ratio having no polarization dependence.

In the case that the first port is an excitation end of an optical fiber and the second port is an excitation end of a light emitting element (e.g., laser diode), it is possible to provide an optical device for two-way communications which can obtain a stable branching ratio having no polarization dependence.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described with reference to the drawings.

Figure 1:
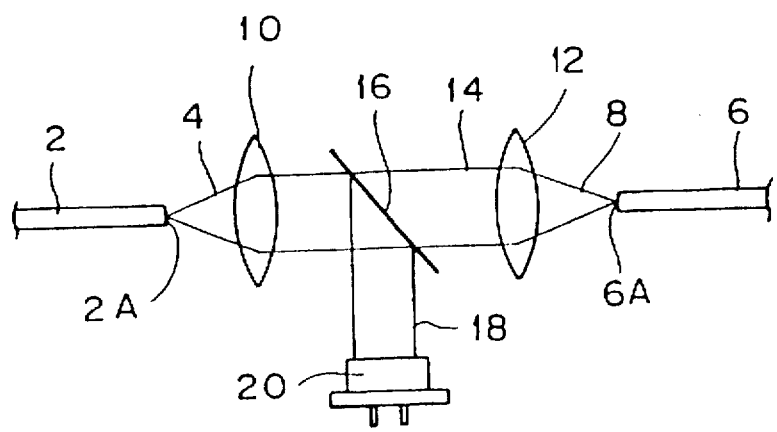
FIG. 1 is a view showing a conventional optical device for branching and monitoring light.
Figure 3:
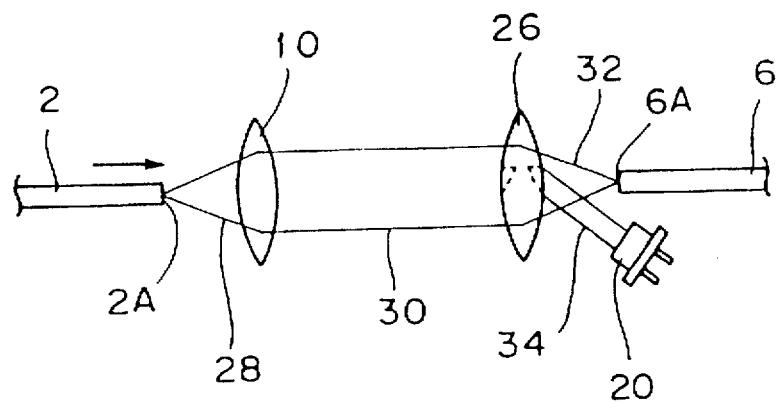
FIG. 3 is a view showing a preferred embodiment of the optical device for branching and monitoring light according to the present invention.

Referring to FIG. 3, there is shown a preferred embodiment of the optical device for branching and monitoring light according to the present invention. A lens 26 characteristic of the present invention is provided so as to be opposed to an excitation end 6A of an optical fiber 6, instead of the lens 12 shown in FIG. 1, and a photodetector 20 is provided in the vicinity of the excitation end 6A in association with the use of the lens 26. A light beam 28 emerging from an excitation end 2A of an optical fiber 2 is converted into a collimated beam 30 by a lens 10. The collimated beam 30 is branched by the lens 26 into a beam 32 converging toward the excitation end 6A of the optical fiber 6 and a beam 34 entering the photodetector 20. The power of the beam 34 is, for example, 5 to 10% of the total power of the beam 30.

Figure 4:
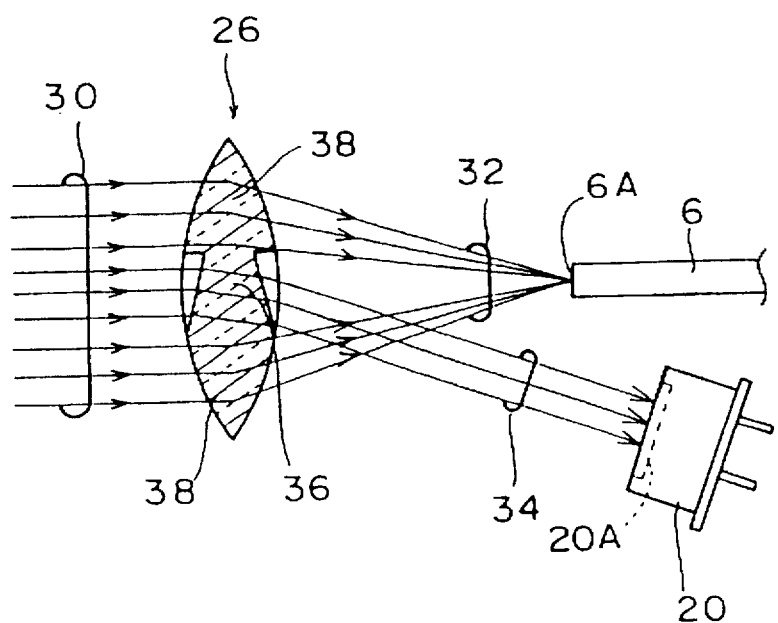
FIG. 4 is a view for illustrating the operation of the optical device shown in FIG. 3.

FIG. 4 is a view for illustrating the operation of the optical device shown in FIG. 3. The lens 26 has a circular shape. The lens 26 has a deflecting portion 36 located substantially centrally of the lens 26 and having a wedged cross section, and a converging portion 38 located peripherally of the lens 26 so as to surround the deflecting portion 36 and having a shape such that the thickness of the converging portion 38 gradually decreases toward the outer edge of the lens 26. The deflecting portion 36 and the converging portion 38 are integral with each other. Part of the collimated beam 30 corresponding to the deflecting portion 36 is deflected by the deflecting portion 36 to become the beam 34, and the beam 34 is then incident on a photodetecting surface 20A of the photodetector 20. The remaining part of the collimated beam 30 is converted by the converging portion 38 into the beam 32 having a circular conical shape with its central portion hollowed, and the beam 32 is then incident on the excitation end 6A of the optical fiber 6.

In this preferred embodiment, the beam 34 is a collimated beam in correspondence with the collimated beam 30, because the deflecting portion 36 has no converging function. Accordingly, the photodetecting surface 20A of the photodetector 20 has an area enough to receive the collimated beam 34 in general.

In modification, the collimated beam 30 and the beam 34 may be replaced with convergent beams by changing the positions of the lenses 10 and 26 (see FIG. 3), whereby a photodetector having a small photodetecting surface can be used.

In this preferred embodiment, the deflecting portion 36 is located substantially centrally of the lens 26. Therefore, even when the lens 26 is displaced vertically as viewed in FIG. 4, the power of the beam incident on the deflecting portion 36 can be maintained at a constant value, thereby obtaining a stable branching ratio. Further, the branching ratio can be arbitrarily set by changing the size of the deflecting portion 36. In the present invention, a spatial beam is branched by diffraction, so that the branching ratio has no polarization dependence.

Figure 2:
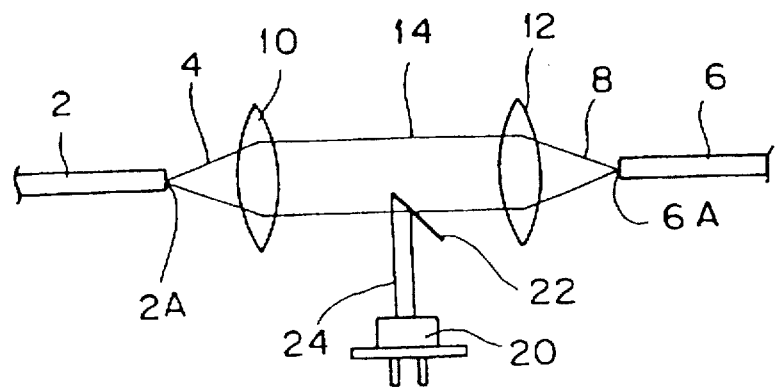
FIG. 2 is a view showing another conventional optical device for branching and monitoring light.

While the beam 32 converged by the converting portion 38 is a hollow spatial beam, there is a small difference in aperture between the case where the deflecting portion 36 is present and the case where it is absent, so that the beam 32 can be efficiently introduced into the optical fiber 6 by locating the excitation end 6A in the vicinity of a beam spot of the beam 32. Further, by fabricating a metal mold for the lens 26, the lens 26 can be mass-produced at low costs, thereby allowing a reduction in cost of the optical device for branching and monitoring light. For example, the optical film 16 shown in FIG. 1 and the total reflection surface 22 shown in FIG. 2 are not required in this preferred embodiment.

Figure 5:
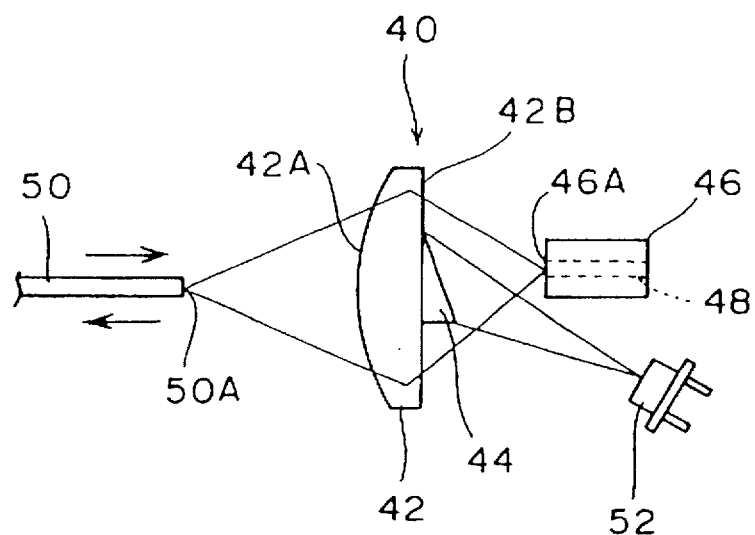
FIG. 5 is a view showing a preferred embodiment of the optical device for two-way communications according to the present invention.

FIG. 5 is a view showing a preferred embodiment of the optical device for two-way communications. A lens 40 characteristic of the present invention is composed of a lens body 42 having a first surface 42A as a convex surface and a second surface 42B as a plane surface, and a wedged optical member 44 attached to the second surface 42B at its substantially central position by means of an optical adhesive, for example. An excitation end 50A of an optical fiber 50 is located so as to be opposed to the first surface 42A of the lens 40. A laser diode 46 as a light emitting element is provided so as to be opposed to the second surface 42B of the lens 40. The laser diode 46 has an excitation end 46A acting as a light emission point. The excitation end 46A is provided as one of the opposite end faces of an active layer 48.

A beam emitted from the excitation end 46A of the laser diode 46 is converged by the first surface 42A of the lens 40 to enter the optical fiber 50 from the excitation end 50A. The optical fiber 50 is connected to one end of an optical transmission line (not shown), and another optical device similar in configuration to that shown in FIG. 5 is connected to the other end of the optical transmission line. A light beam from a laser diode of the other optical device is transmitted by the optical fiber 50 and emitted from the excitation end 50A of the optical fiber 50. A part of the beam emitted from the excitation end 50A is deflected by the wedged optical member 44 to enter a photodetector 52.

According to this preferred embodiment, intensity-modulated signal light can be generated by modulating a drive current for driving the laser diode 46, and this signal light can be received by a photodetector of the other optical device. Further, the signal light from the laser diode of the other optical device can be received by the photodetector 52 of FIG. 5. With such a simple configuration, an optical transmission/reception device for two-way communications can be provided. Also in this preferred embodiment, a branching ratio (coupling efficiency) on the laser diode 46 and the photodetector 52 has no polarization dependence. Further, since the wedged optical member 44 is provided at the substantially central position of the second surface 42B of the lens body 42, a stable branching ratio (coupling efficiency) can be obtained. In modification, the wedged optical member 44 and the lens body 42 may be formed integrally with each other rather than attaching the wedged optical member 44 to the lens body 42.

As described above, according to the present invention, it is possible to provide an optical device which can obtain a stable branching ratio having no polarization dependence.

The optical device according to the present invention can be applied to an optical amplifier. The optical amplifier includes, for example, the optical device according to the present invention as shown in FIG. 3, an optical amplifying medium operatively connected to at least one of the optical fibers 2 and 6, and means for pumping the optical amplifying medium so that the optical amplifying medium has a gain band including a wavelength of signal light to be amplified. In the case that the optical amplifying medium is a doped fiber doped with a rare earth element, the pumping means includes a light source for outputting pump light having a suitable wavelength. Er (erbium) as a dopant is suitable for amplification of signal light having a wavelength of 1.5 μm band. In this case, the wavelength of the pump light is set to 0.98 μm band or 1.48 μm band. Alternatively, a semiconductor chip may be used as the optical amplifying medium. In this case, the pumping means includes means for injecting a current into the semiconductor chip.

In the case that the optical amplifying medium is operatively connected to the optical fiber 2 shown in FIG. 3, the power of amplified signal light can be detected, and ALC (automatic level control) of this optical amplifier can be carried out according to a detection value of the power. In the case that the optical amplifying medium is operatively connected to the optical fiber 6 shown in FIG. 3, an input level of the optical amplifier can be monitored. Further, in the case that the optical device shown in FIG. 3 is connected to each of an input side and an output side of the optical amplifying medium, an input level and an output level of the optical amplifier can be monitored. By monitoring the input level and the output level, the gain of the optical amplifier can be detected, thereby allowing easy control such that the gain becomes constant, for example.

Figure 6:
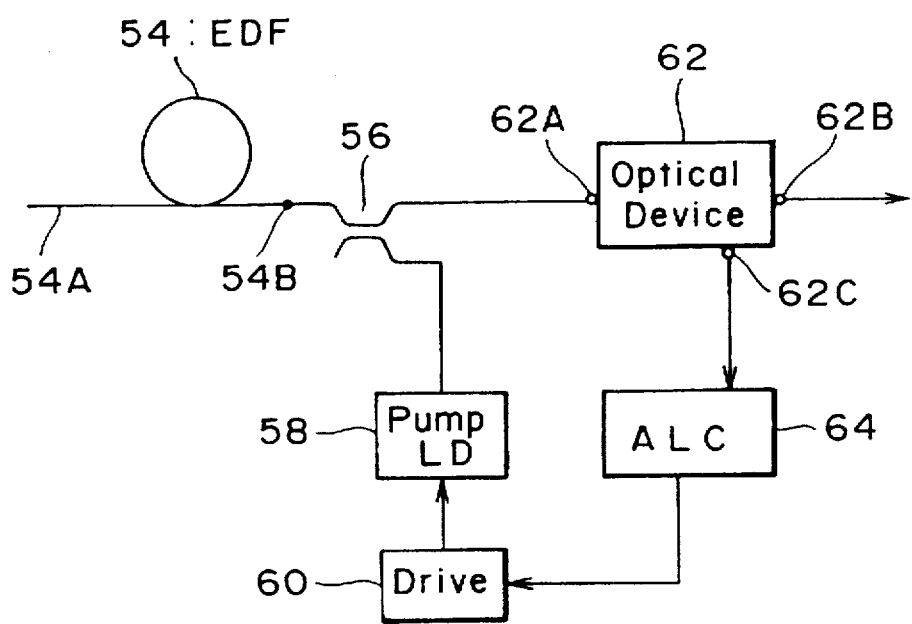
FIG. 6 is a block diagram of an optical amplifier according to the present invention.

Referring to FIG. 6, there is shown a block diagram of an optical amplifier according to the present invention. An erbium doped fiber (EDF) 54 as the optical amplifying medium has a first end 54A and a second end 54B. Signal light to be amplified is supplied to the first end 54A. Pump light is supplied from a pump LD (laser diode) 58 through a WDM (wavelength division multiplexing) type optical coupler 56 to the second end 54B. When the signal light is supplied from the first end 54A in the condition where the EDF 54 is pumped by the pump light, the signal light is amplified in the EDF 54. The amplified signal light is then supplied through the optical coupler 56 to an input port 62A of an optical device 62 according to the present invention. The input port 62A corresponds to the optical fiber 2 shown in FIG. 3. The optical device 62 has an output port 62B corresponding to the optical fiber 6 shown in FIG. 3 and a terminal 62C for outputting an electrical signal from the photodetector 20. The pump LD 58 is supplied with a bias current from a drive circuit 60. An ALC (automatic level control) circuit 64 controls the bias current to be supplied from the drive circuit 60 to the pump LD 58 so that the level of the output signal from the terminal 62C becomes constant.

In the optical amplifier shown in FIG. 6, a polarized condition of the amplified signal light to be supplied to the input port 62A of the optical device 62 is not constant. However, in the optical device 62 according to the present invention, monitoring of light power not depending upon polarization can be performed, so that stable ALC can be performed irrespective of the polarized condition of the amplified signal light.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:

a first port having a first aperture;

a second port having a second aperture;

a lens located between said first port and said second port; and a photodetector having a photodetecting surface located in the vicinity of said second port;

said lens having a converging portion for converting a light beam so as to couple said first aperture and said second aperture, and a deflecting portion for deflecting a part of a light beam from said first port to make said part incident on said photodetecting surface.

2. An optical device according to claim 1, wherein:

said lens has a circular shape;

said deflecting portion is located substantially centrally of said lens and has a wedged cross section; and said converging portion is located peripherally of said lens so as to surround said deflecting portion and has a shape such that a thickness of said converging portion gradually decreases toward an outer edge of said lens.

3. An optical device according to claim 2, wherein said deflecting portion and said converging portion are integral with each other.

4. An optical device according to claim 1, wherein said lens comprises a lens body having a first surface as a convex surface and a second surface as a plane surface, and a wedged optical member attached to said second surface at its substantially central position.

5. An optical device according to claim 1, wherein said first port comprises an excitation end of an optical fiber, and said second port comprises an excitation end of another optical fiber.

6. An optical device according to claim 1, wherein said first port comprises an excitation end of an optical fiber, and said second port comprises an excitation end of a light emitting element.

7. An optical device according to claim 1, further comprising:

an optical amplifying medium operatively connected to at least one of said first port and said second port; and a means for pumping said optical amplifying medium so that said optical amplifying medium has a gain band.

8. An optical device according to claim 7, wherein:

said optical amplifying medium comprises a rare earth element doped fiber operatively connected to said first port;

said pumping means comprises a pump laser diode for outputting pump light, and an optical coupler for supplying said pump light to said rare earth element doped fiber; and said optical device further comprises a means for controlling power of said pump light so that an output from said photodetector becomes constant.

* * * * *